United States Patent
Kairali et al.

(10) Patent No.: US 12,323,736 B2
(45) Date of Patent: Jun. 3, 2025

(54) RENDERING AN EXTENDED-REALITY REPRESENTATION OF A VIRTUAL MEETING INCLUDING VIRTUAL CONTROLLERS CORRESPONDING TO REAL-WORLD CONTROLLERS IN A REAL-WORLD LOCATION

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN); Smitha Padmanabhan, Kakkanad (IN); Swapnil Dongre, Bangalore (IN); Manish Anand Bhide, Hyderabad (IN); Binoy Thomas, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 18/178,247

(22) Filed: Mar. 3, 2023

(65) Prior Publication Data
US 2024/0297960 A1   Sep. 5, 2024

(51) Int. Cl.
H04N 7/15      (2006.01)
B25J 9/16      (2006.01)

(52) U.S. Cl.
CPC ............ H04N 7/152 (2013.01); B25J 9/1671 (2013.01); B25J 9/1689 (2013.01); H04N 7/157 (2013.01)

(58) Field of Classification Search
CPC ................................ H04N 7/152; H04N 7/157
See application file for complete search history.

(56) References Cited

U.S. PATENT DOCUMENTS 9,643,314 B2    5/2017   Guerin et al.
2018/0338164 A1*  11/2018  Baughman ......... H04N 21/4758
(Continued)

OTHER PUBLICATIONS

E. Matsas, et al., "Design of a virtual reality training system for human-robot collaboration in manufacturing tasks", School of Mechanical Engineering, National Technical University of Athens, Feb. 5, 2015, 15 pp.

(Continued)

Primary Examiner — Stella L. Woo
(74) Attorney, Agent, or Firm — Konrad, Raynes, Davda & Victor LLP; David W. Victor (57) ABSTRACT

Provided are a computer program product, system, and method for rendering an extended-reality representation of a virtual meeting. An extended reality representation is generated of a virtual meeting including avatars associated with participants in the virtual meeting to render in extended-reality displays of the participants. An extended-reality representation of a virtual controller corresponding to a real-world controller in a real-world location is generated to render in at least one extended-reality display of at least one participant in the virtual meeting. Participant input is received from one of the at least one participant to control the virtual controller. The participant input is translated to control the virtual controller to commands to control the real-world controller. The commands are transmitted to the real-world controller at the real-world location to control the real-world controller to perform actions in the real-world location to carry out the transmitted commands.

20 Claims, 5 Drawing Sheets

(56) References Cited

U.S. PATENT DOCUMENTS

| | | | |
|---|---|---|---|
| 2021/0074068 A1 | 3/2021 | Spivack et al. | |
| 2021/0237275 A1 | 8/2021 | Stone | |
| 2021/0252699 A1 | 8/2021 | Ramani et al. | |
| 2023/0368105 A1* | 11/2023 | Brevoort | G06Q 10/0633 |
| 2024/0160274 A1* | 5/2024 | Breitweiser | G06N 20/00 |
| 2024/0202808 A1* | 6/2024 | Jayaraman | G06Q 40/02 |
| 2024/0242449 A1* | 7/2024 | Ökvist | G06T 13/40 |

OTHER PUBLICATIONS

S. You, et al., "Enhancing Perceived Safety in Human-Robot Collaborative Construction Using Immersive Virtual Environments", Elsevier Automation in Construction, 2018, 10 pp.

J. Antunes, "Canon and IBM using volumetric video to promote visual arts", ProVideo, Jul. 2021, 8 pp., [online] [retrieved Feb. 16, 2023] https://www.provideocoalition.com/canon-and-IBM-using-volumetric-video-to-promote-visual . . .

"Canon and IBM Japan Form Business Operation Utilizing Volumetric Video Technology to Promote Visual and Performing Arts", Canon, Jul. 7, 2021, 4 pp., [online][retrieved Feb. 17, 2023] https://www.sg.canon/en/consumer/form-joint-utilizing-volumetric-video-technology/news.

"Canon, Inc and IBM Launch Entertainmen and the Arts in Japan", IBM Corporation, Jul. 15, 2021, 3 pp., [online] [retrieved Feb. 16, 2023] https://newsroom.ibm.com/2021-07-15-Canon,-Inc-and-IBM-Lau . . .

"How does the future look for collaboration in the metaverse?", TechSutra, [online][retrieved Feb. 17, 2023] https://www.techsutra.ae/post/how-does-the-future-look-for-collaboratio . . .

A. Cohen, "Welcome to the Netaverse, where Brooklynn Nets Players Can Be Seen in a Whole New Light", Sports Business Journal, Feb. 3, 2022, 3 pp., [online][retrieved Feb. 21, 2023] https://www.sportsbusinessjournal.com/Daily/issues/2022/03/Technology/welcome-to-the-Netaverse-where-Brooklyn-Nets-Players-Can-Be-Seen-in-a-Whole-New-Light.

R. Hahn, "The Metaverse Is the Future: The Office is Dead. Long Live the Office", NotoriousRob.com, Dec. 20, 2021, 18 pp., [online][retrieved Feb. 17, 2023] https://notoriousrob.com/2021/12/the-metaverse-is-the-future-the-office-.

M. Walker, et al., "Virtual, Augmented, and Mixed Reality for Human-Robot Interaction: A Survey and Virtual Design Element Taxonomy", arXiv:2202.11249v1, Feb. 23, 2022, 32 pp.

"What is Volumetric Video? A Beginners Guide to the Next Stage of Video", Arcturus, Apr. 5, 2022, 8 pp.

"Spatial.io Website," Spatial Systems, Inc., 2023, [downloaded from https://web.archive.org/web/20230221042031/https://www.spatial.io/ on Jul. 12, 2023] [dated Feb. 23, 2023] 8 pp.

\* cited by examiner

FIG. 1

Virtual Controller Information

RENDERING AN EXTENDED-REALITY REPRESENTATION OF A VIRTUAL MEETING INCLUDING VIRTUAL CONTROLLERS CORRESPONDING TO REAL-WORLD CONTROLLERS IN A REAL-WORLD LOCATION

BACKGROUND OF THE INVENTION

1. Field of the Invention

The present invention relates to a computer program product, system, and method for rendering an extended-reality representation of a virtual meeting including virtual controllers corresponding to real-world controllers in a real-world location.

2. Description of the Related Art

A virtual meeting is a meeting that takes place remotely, using communication technology to connect participants who are not in the same physical location. It allows people to collaborate, discuss, and make decisions without the need for everyone to be in the same room. Virtual meetings have become increasingly popular in recent years, particularly in the wake of the COVID-19 pandemic, which has led to a surge in remote work and remote collaboration. Virtual meetings offer many benefits, including increased flexibility, reduced travel costs, and the ability to connect with people from anywhere in the world. However, they can also present challenges, such as technical difficulties, communication barriers, and difficulties in building rapport and trust with team members.

Participants in a virtual meeting may be represented by avatars in a virtual conference room and the participants may view the virtual meeting through extended-reality (ER) smart glasses, which are wearable computer-capable glasses that generate virtual objects, such as three-dimensional images, text, animations, and videos, to overlay into the wearer's field of vision to enable the wearer to view and interact with the virtual objects in the virtual meeting.

Extended reality, as that term is used herein, refers to any of virtual reality (VR), where the entire view of the user is synthetic imagery, augmented reality (AR) where virtual objects or synthetic imagery are added to a view of a real environment, mixed reality (MR) where there is a combination of synthetic and real imagery to form the space, and augmented virtuality (AV) where real imagery is added to a synthetic environment. Thus, extended reality, as that term is used herein, falls on the continuum from total virtuality or total synthetic imagery to a combination of synthetic and real imagery.

There is a need in the art to provide improved techniques for participants in a virtual meeting to collaborate more effectively to carry out tasks.

SUMMARY

Provided are a computer program product, system, and method for rendering an extended-reality representation of a virtual meeting including virtual controllers corresponding to real-world controllers in a real-world location. An extended reality representation is generated of a virtual meeting including avatars associated with participants in the virtual meeting to render in extended-reality displays of the participants in the virtual meeting. An extended-reality representation of a virtual controller corresponding to a real-world controller in a real-world location is generated to render in at least one extended-reality display of at least one participant in the virtual meeting. Participant input is received from one of the at least one participant to control the virtual controller. The participant input is translated to control the virtual controller to commands to control the real-world controller. The commands are transmitted to the real-world controller at the real-world location to control the real-world controller to perform actions in the real-world location to carry out the transmitted commands.

DETAILED DESCRIPTION

Described embodiments provide computer technology to implement a virtual controller in a virtual meeting to allow participants in the virtual meeting to manipulate the virtual controller to control a corresponding real-world controller in a real-world environment. Described embodiments provide computer technology to ensure that only authorized users have access to the virtual controller. Further, with described embodiments, the virtual controller in the virtual meeting may be rendered with an extended-reality representation of the real-world environment based on volumetric images captured by volumetric cameras in the real-world location.

Thus, described embodiments provide an enhancement to virtual meetings by allowing the participants to virtually engage a virtual controller in the virtual meeting to collaborate on controlling a real-world controller at a real-world location as part of the virtual meeting presentation.

Figure 1:
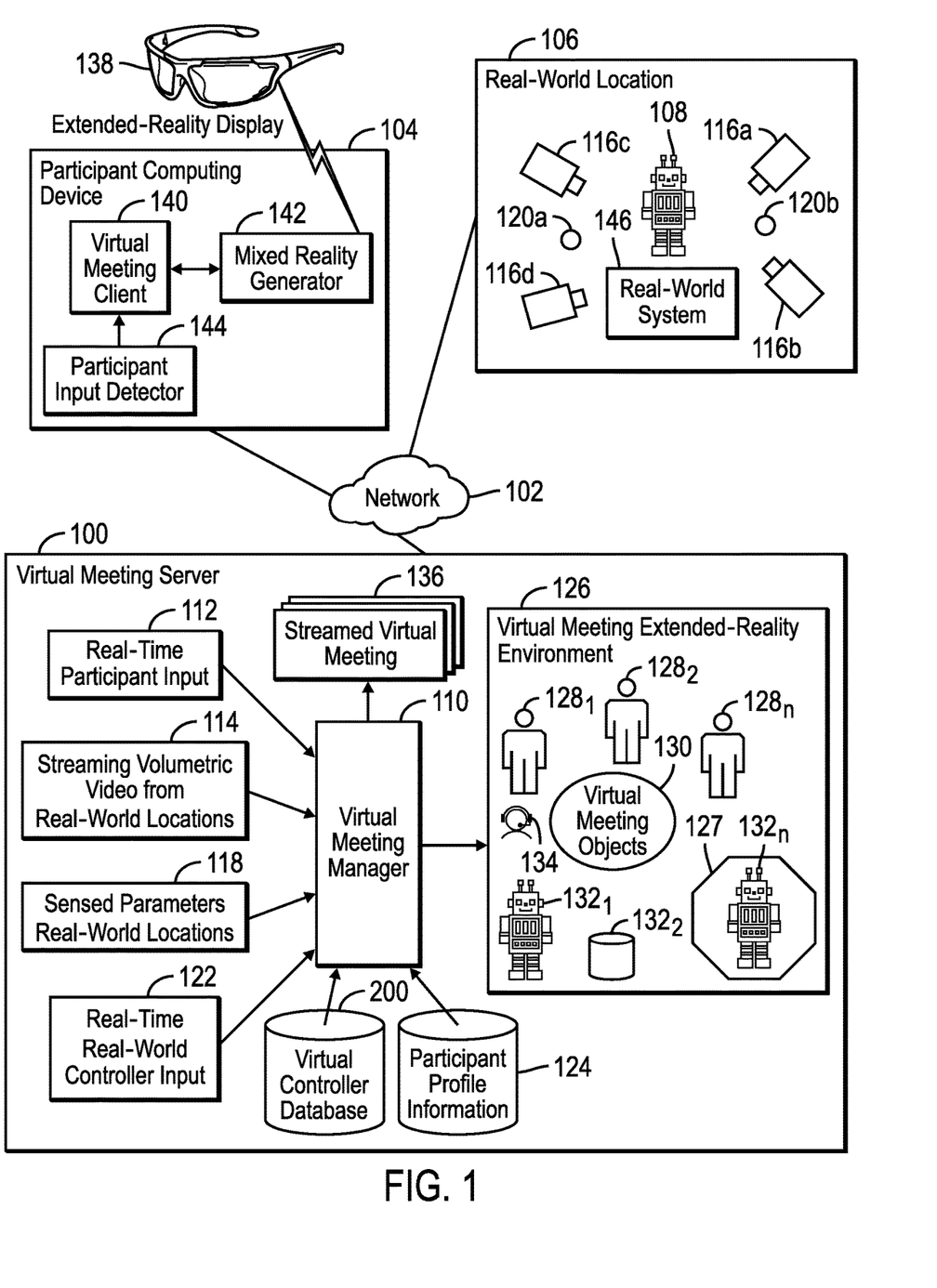
FIG. 1 illustrates an embodiment of a computing environment to generate a virtual meeting extended-reality environment in which virtual controllers may be presented to control real world controllers.

FIG. 1 illustrates an embodiment of a virtual meeting server 100 in communication over a network 102 with a participant computing device 104 of participants in a virtual meeting maintained by the virtual meeting sever 100, and a real-world location 106 in which a participant of the virtual meeting will control a real-world controller 108 in the virtual meeting. The participant computing device 104 is coupled to an extended-reality display 138, e.g., augmented reality or virtual reality glasses, gaze tracking device, etc., such as via wireless communication methods. There may be multiple instances of the participating computing device 104 and the real-world location 106.

The virtual meeting server 100 includes a virtual meeting manager 110 that generates a virtual meeting environment 110 based on: real-time participant input 112 received from participant computing devices 104; streaming volumetric video 114 gathered from volumetric video cameras 116*a*, 116*b*, 116*c*, 116*d* in real-world locations 106; sensed parameters 118 sensed from sensors 120a, 120b placed in the real-world locations 106; real-time real-world controller input 122 received from the real-world virtual controllers 108 gathered in the real-world locations 106, including status of controller actions and movements and environmental conditions, e.g., temperature, etc.; virtual controller database 200 providing information on virtual controllers to render in the virtual meeting; and user profile information 124 providing information on participants of a virtual meeting and their avatars to render in a virtual meeting.

Based on the received inputs 112, 114, 118, 122, 124, 200, the virtual meeting manager 110 renders a virtual meeting environment 126 providing a virtual representation of a meeting among participants $128_1$, $128_2$ ... $128_n$ represented by their avatars. The virtual meeting manager 110 may render virtual meeting objects 130, including a table, chairs for the participant avatars, environmental designs in the meeting, etc. In response to a participant $128_i$ requesting to add a virtual controller $132_i$ to the virtual meeting to enable control of a corresponding real-world controller 10, the virtual meeting manager 110 renders in the virtual meeting environment 126 the virtual controller $132_i$ corresponding to the real-world controller 108 the participant wants to control. Virtual controllers $132_1$, $132_2$ may represent a moveable robot 108 capable of performing actions and moving around in a real-world location 106 and virtual controller $132_2$ may represent a real-world cloud-based service device for controlling systems and components in a real-world location 106 through voice commands or other remote commands. The virtual controllers $132_1$, $132_n$ may comprise any type of controllable equipment, including stationary machines, such as machine tools, processing equipment, printers, computer equipment, etc., moveable robots, remote-controlled/autonomous vehicles, space craft, etc.

The virtual meeting manager 110 may render in a viewing area 127 of the virtual meeting extended-reality environment 126 an extended-reality representation of the location 106 from the streaming volumetric video 114 from the real-world location including the real-world controller corresponding to virtual controller $132_n$. If a virtual controller $132_n$ is rendered in a viewing area 127 comprising the extended-reality display representation of the location 106, based on the volumetric video 114 of the real-world location, then the participant may control the virtual controller $132_n$ by virtually reaching into the real-world location 106 presented in the viewing area 127 to manipulate the virtual controller $132_n$ rendered in the viewing area 127. In this way, the participant is virtually reaching from the virtual meeting 126 extended-reality environment into the location 106 mixed reality environment in the viewing area 127 to manipulate the virtual controller $132_n$ rendered in the viewing area 127.

Although embodiments are described with respect to volumetric video, in alternative embodiments, other types of video, images and/or audio of the real-world location 106 may be provided to the virtual manager 110 to render in the viewing area 127. The virtual manager 110 may further render in the virtual meeting extended-reality environment 126 display of a virtual assistant 134 with which the participants $128_1$, $128_2$ ... $128_n$ may interact.

The virtual meeting manager 110 may determine from the participant profile information 124 the virtual controllers $132_1$, $132_2$ ... $132_n$ each participant $128_1$, $128_2$ ... $128_n$ has permission to access (view and/or control) for a real-world location 106. The virtual meeting manager 110 may render different virtual meeting extended-reality environments 126 for the participants $128_1$, $128_2$ ... $128_n$ so only items they have permission to view are rendered. The virtual meeting manager 110 outputs streamed virtual meetings 136 to the participant computing devices 104 of participants having permission to view that version of the virtual meeting 126 to render in extended-reality displays 138 of the participants $128_1$, $128_2$ ... $128_n$.

The participant computing device 104 is coupled to extended-reality display 138, e.g., virtual reality glasses, augmented reality glasses, gaze tracking device, etc., such as via wireless communication methods. Alternatively, the participant computing device 104 may be implemented in the body of the extended-reality display 138. The participant computing device 104 may include a virtual meeting client 140 to receive a streamed virtual meeting 136 from the virtual meeting manager 110 to forward to the extended-reality generator 142 to render the streamed virtual meeting 136 in the extended-reality display 138. A participant input detector 144 may receive participant input and interaction with the virtual meeting 126, such voice from a microphone, selections via a computer mouse, keyboard, game controller, other input controller, hand motion signals detected from a data or smart glove, etc. Participant input may be further received via the extended-reality display 138 detecting eye movement using gaze tracking technology, that is then transmitted to the virtual meeting client 140 via the extended-reality generator 142. The virtual meeting client 140 may interpret this participant input with respect to the participant avatar $128_i$ in the virtual meeting 126 and forward to the virtual meeting manager 110 to render in the virtual meeting 126 for other participants to observe.

In one embodiment, the extended-reality display 138 may comprise a type of computer vision glasses to render extended-reality virtual objects. The extended-reality display 138 may further comprise a gaze tracking device to receive a gazed virtual object detected by eye tracking cameras that acquire the gazed virtual object on which the tracked eye is fixed and information on coordinates of an axis of a line-of-sight, also referred to as sightline, visual axis, the user is viewing within the field of vision captured by the gaze tracking device tracking. Extended-reality smart glasses are wearable computer-capable glasses that generate virtual objects, such as three-dimensional images, text, animations, and videos, to overlay into the wearer's field of vision so the digital information is viewable along with real-world scenes in the wearer's field of vision. The display 138 may further provide augmented reality (AR) virtual objects. Augmented reality is used to supplement information presented to users on items they are looking at, such as augmented reality controls to control items in the wearer's field of vision or information on locations in the field of vision. Additionally, the extended-reality glasses 138 may provide extended-reality virtual objects that interact with the real-world. For instance, a extended-reality virtual object may react to you in the same way as it would in the real-world, such as move closer to the user as the user moves closer to the virtual object.

The extended-reality glasses 138 include a processor, display, sensors and input devices, and may include many of the components found in smartphones and tablet computers. Extended-reality rendering may be performed by optical projection systems, monitors, handheld devices, and display systems worn on the human body. A head-mounted display (HMD) is a display device worn on the forehead, such as a harness or helmet-mounted. HMDs place images of both the physical world and virtual objects over the user's field of view. Modern HMDs often employ sensors for six degrees of freedom monitoring that allow the system to align virtual information to the physical world and adjust accordingly with the user's head movements. The HMDs may also implement gesture controls for full virtual immersion.

Extended-reality reality displays may be rendered on devices resembling eyeglasses, and employ cameras to intercept real-world view and re-display its augmented view through the eye pieces and devices in which MR imagery is projected through or reflected off the surfaces of the eyewear lens places. Other implementations of MR displays include a head-up display (HUD), which is a transparent display that presents data without requiring users to look away from their usual viewpoints.

Extended-reality may include overlaying the information and registration and tracking between the superimposed perceptions, sensations, information, data, and images and some portion of the real-world. Additional extended-reality implementations include contact lenses and virtual retinal display, where a display is scanned directly into the retina of a viewer's eye. EyeTap augmented reality devices capture rays of light that would otherwise pass through the center of the lens of the wearer's eye, and substitutes synthetic computer-controlled light for each ray of real light. The extended-reality display 138 may further use motion tracking technologies, including digital cameras and/or other optical sensors, accelerometers, GPS, gyroscopes, solid state compasses, radio-frequency identification (RFID).

Extended reality, as that term is used herein, refers to any of virtual reality (VR), where the entire view of the user is synthetic imagery, augmented reality (AR) where virtual objects or synthetic imagery are added to a view of a real environment, mixed reality (MR) where there is a combination of synthetic and real imagery to form the space, and augmented virtuality (AV) where real imagery is added to a synthetic environment. Thus, extended reality, as that term is used herein, falls on the continuum from total virtuality or total synthetic imagery to a combination of synthetic and real imagery.

In a virtual reality environment, the mixed reality display 138 renders the entire environment so the participant is fully immersed in the virtual meeting 126 without being able to visualize their external environment. In an augmented reality environment, elements of the virtual meeting 126, such as representations of the participant avatars $128_1$, $128_2$ ... $128_n$, virtual controllers 132a, 132b, 132c, and virtual meeting objects 130 are rendered within the participant's real-world environment, such as superimposed within the real-world environment.

A real-world location 106 further includes a real-world system 146 to gather information from the sensors 120a, 120b on sensed data from the real-world location 106, video from the volumetric video cameras 116a, 116b, 116c, 116d, and information from the virtual controller $132_i$ to process and return to the virtual meeting server 100 to digest. The system 146 may further receive the commands from the virtual meeting server 100 to forward to the real-world controller 108. The system 146 may process the video captured from the specialized volumetric video cameras 116a, 116b, 116c, 116d, which may include traditional 4K video cameras and depth sensing cameras. The captured video is processed by software to render into three-dimensional data in a virtual space in a single volumetric video. Inside this volumetric virtual space, content can be viewed from any angle. Alternatively, the captured video may be sent to the virtual meeting server 100 to assemble into a single volumetric video.

The network 102 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIG. 1 between the components and objects in the virtual meeting server 110 and the participant computing device 104 represent a data flow between the components.

Generally, program modules, such as the program components 110, 140, 142, 144, program components of system 146, 208, and 210 may comprise routines, programs, objects, components, logic, data structures, and so on that perform particular tasks or implement particular abstract data types. The program components and hardware devices of the systems 100, 104, 146 of FIGS. 1, 208, and 210 may be implemented in one or more computer systems, where if they are implemented in multiple computer systems, then the computer systems may communicate over a network.

The program components 110, 140, 142, 144, program components of system 146, 208, and 210 may be accessed by a processor from memory to execute. Alternatively, some or all of the program components 110, 140, 142, 144, program components of system 146, 208, and 210 may be implemented in separate hardware devices, such as Application Specific Integrated Circuit (ASIC) hardware devices.

The functions described as performed by the program 110, 140, 142, 144, program components of system 146, 208, and 210 may be implemented as program code in fewer program modules than shown or implemented as program code throughout a greater number of program modules than shown.

The participant computing device 104 may comprise a personal computing device, such as a laptop, desktop computer, tablet, smartphone, wearable computer, etc. The server 100 and real-world system 146 may comprise one or more server class computing devices, or other suitable computing devices. Alternatively, the participant computing device 104 may be embedded in the extended-reality display 138.

Figure 2:
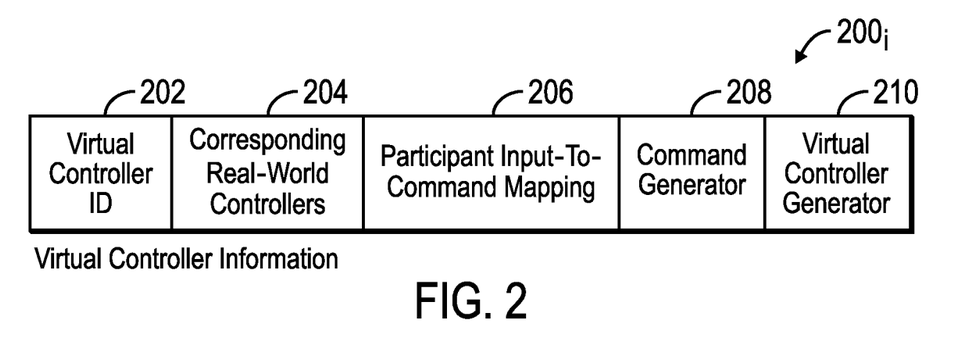
FIG. 2 illustrates an embodiment of a virtual controller information for virtual controllers to render in a virtual meeting.

FIG. 2 illustrates an embodiment of an instance of virtual controller information $200_i$ in the virtual controller database 200, and includes or identifies: a virtual controller identifier (ID) 202; one or more corresponding real-world controllers 204 represented by the virtual controller 202 and locations in which they are included; a participant input-to-command mapping 206 that maps possible participant input to the virtual controller $132_i$ to real-world controller commands and command parameters to control the real-world controller 108; a command generator 208 to generate a real-world controller command and parameters from the participant input 112, mapping 206, sensed parameters 118 from real-world location in which the physical controller operates, and information 122 from the real-world controller 108; and a virtual controller generator 210 including objects and code to generate a representation of the virtual controller 202 in the virtual meeting 126.

In certain embodiments, the command generator 208 may comprise a machine learning model trained to receive inputs 112, 206, 118, 122 and output the correct real-world controller command to control the real-world controller 108 to implement what the participant intended from the participant input 112 to manipulate the virtual controller $132_i$.

Figure 3:
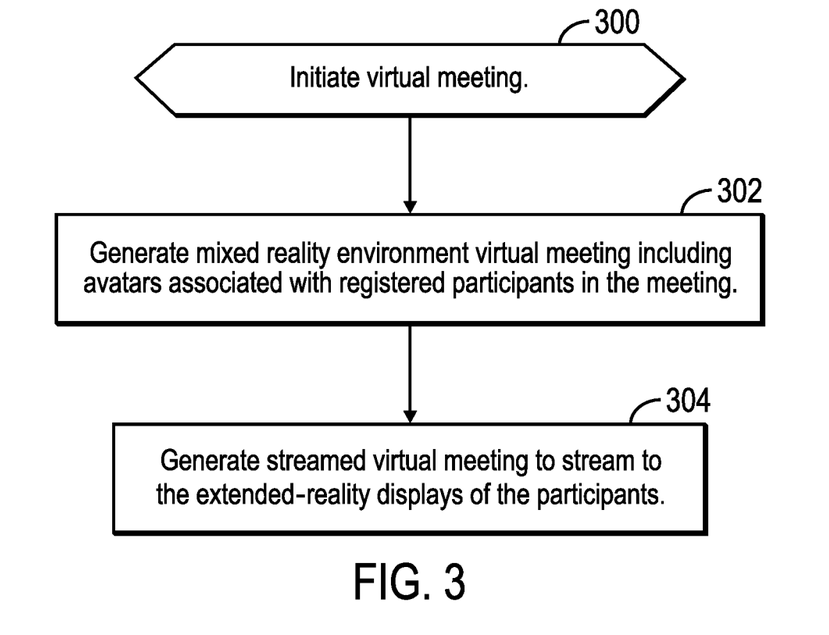
FIG. 3 illustrates an embodiment of operations to initiate a virtual meeting.

FIG. 3 illustrates an embodiment of operations performed by the virtual meeting manager 110 to initiate the virtual meeting 126. Upon initiating (at block 300) the virtual meeting, the virtual meeting manager 110 generates (at block 302) a mixed reality environment virtual meeting 126 including avatars $128_1$, $128_2$ ... $128_n$ associated with registered participants in the meeting and virtual meeting objects 130, such as tables, chairs, and other scene elements of a meeting. The virtual meeting manager 110 generates streamed virtual meeting 136 instances to stream to the extended-reality displays 138 of the participants. The virtual meeting manager 110 may update the streamed content 136 based on real-time participant input 112 indicating movement of avatars in the virtual meeting 126.

Figure 4:
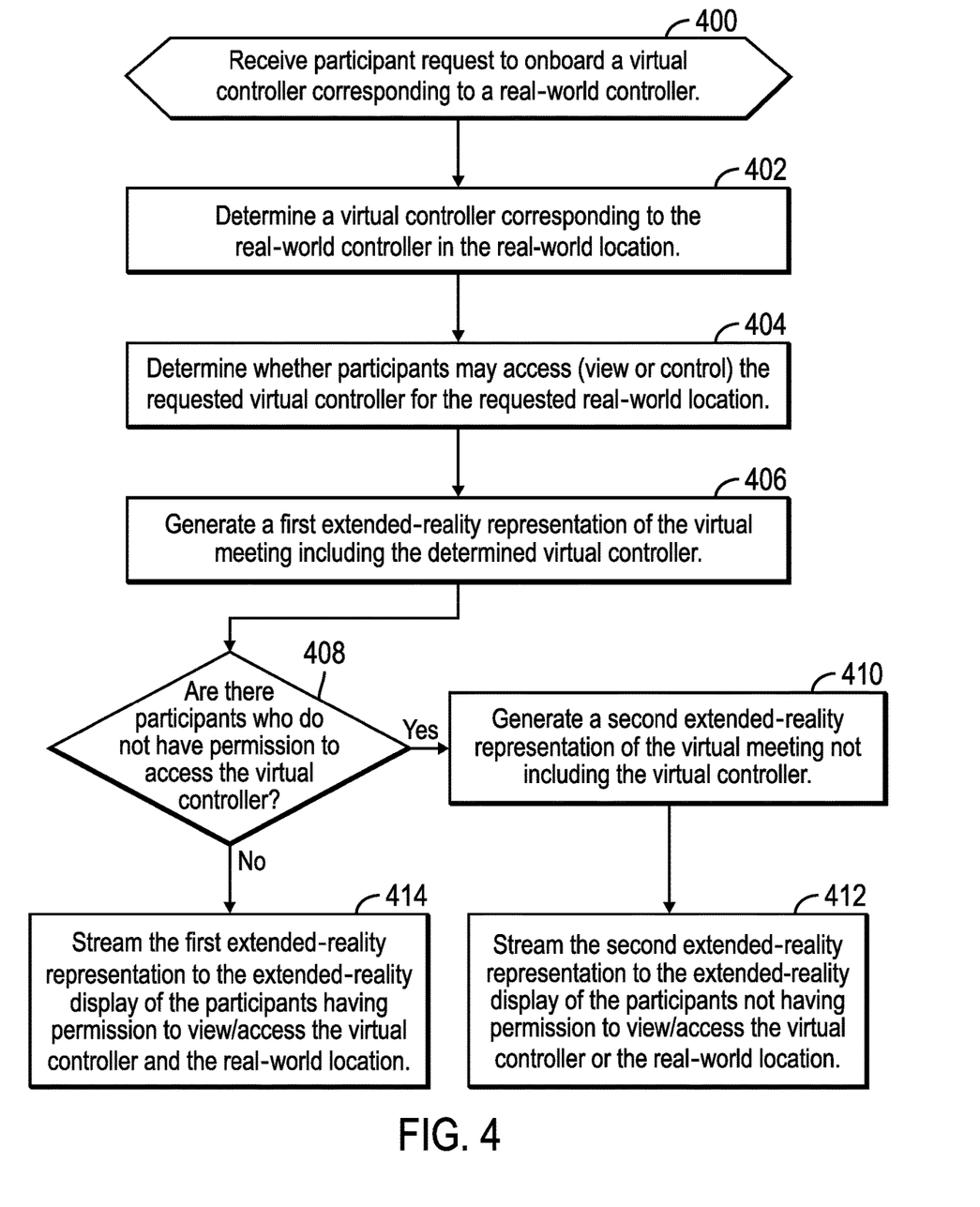
FIG. 4 illustrates an embodiment of operations to add a virtual controller in a virtual meeting.

FIG. 4 illustrates an embodiment of operations performed by the virtual meeting manager 110 to render virtual controllers in the virtual meeting 126. Upon receiving (at block 400) a participant $128_i$ request to add a virtual controller $132_i$ corresponding to a real-world controller 108 in a real-world location 106, the virtual meeting manager 110 determines (at block 402) a virtual controller 202 corresponding to the real-world controller 108 in the real world location 106 from the virtual controller database 200. The virtual meeting manager 110 determines (at block 404), from the participant profile information 124 of the participants $128_1$, $128_2$ . . . $128_n$, whether the participants may access (view or control) the virtual controller 202 for the real-world location 106. The permission may have to be for both the virtual controller 202 and the specific real-world location 106 having the real-world controller 108 to allow a participant to access a virtual controller representing that specific real-world controller 108.

The virtual meeting manager 110 generates (at block 406) a first streamed virtual meeting $136_1$ including the virtual controller $132_i$. If (at block 408) there are participants $128_i$ who do not have permission to access the virtual controller $132_i$ to add to the virtual meeting 126, then a second streamed virtual meeting $136_2$ not including the virtual controller $132_i$ is generated (at block 410). The second streamed virtual meeting $136_2$ is streamed (at block 412) to the extended-reality display 138 of the participants $128_i$ not having permission to view/access the virtual controller $132_i$ to control the real world controller 108 in the real-world location 106. The first streamed virtual meeting $136_1$ is streamed (at block 414) to the extended-reality display 138 of the participants $128_j$ to view/access the virtual controller $132_i$ to control the real-world controller 108 in the real-world location. If volumetric video 114 is provided for a real-world location 106, then the virtual controller $132_i$ may be rendered within a viewing area 127 having an extended-reality presentation of the real-world location 106, generated from the volumetric video 114 of the real-world location 106. In this way, the virtual controller $132_i$ is presented in the rendering of the real-world location 106 in the viewing area 127 so the participant has a portal into an extended-reality presentation of the real-world location 106.

In streaming to different participants, the virtual meeting manager 110 may generate entirely different virtual meeting extended-reality environments 126 with and without the virtual controller $132_i$ for participants having permission and not having permission, respectively, to stream separately. In alternative embodiments, the virtual meeting manager 110 may send the same base virtual meeting environment 126 without any virtual controllers $132_i$ to all the participants and then stream a mixed reality representation of the virtual controller $132_i$ to only to those participants having permission to access the virtual controller $132_i$.

With the embodiment of FIG. 4, a participant in a virtual meeting may add a virtual controller $132_i$ to enable the participant in the virtual meeting to control a real-world controller 108 corresponding to the virtual controller $132_i$ while participating in the virtual meeting, and allow multitasking in the meeting, including collaborative control of the virtual controller relevant to the presentation in the virtual meeting. Further, participants with permission may view the virtual controller $132_i$ that has been added to allow sharing and collaboration of the virtual controller $132_i$ to controller a real-world controller 108 in a real-world location 106.

Figure 5:
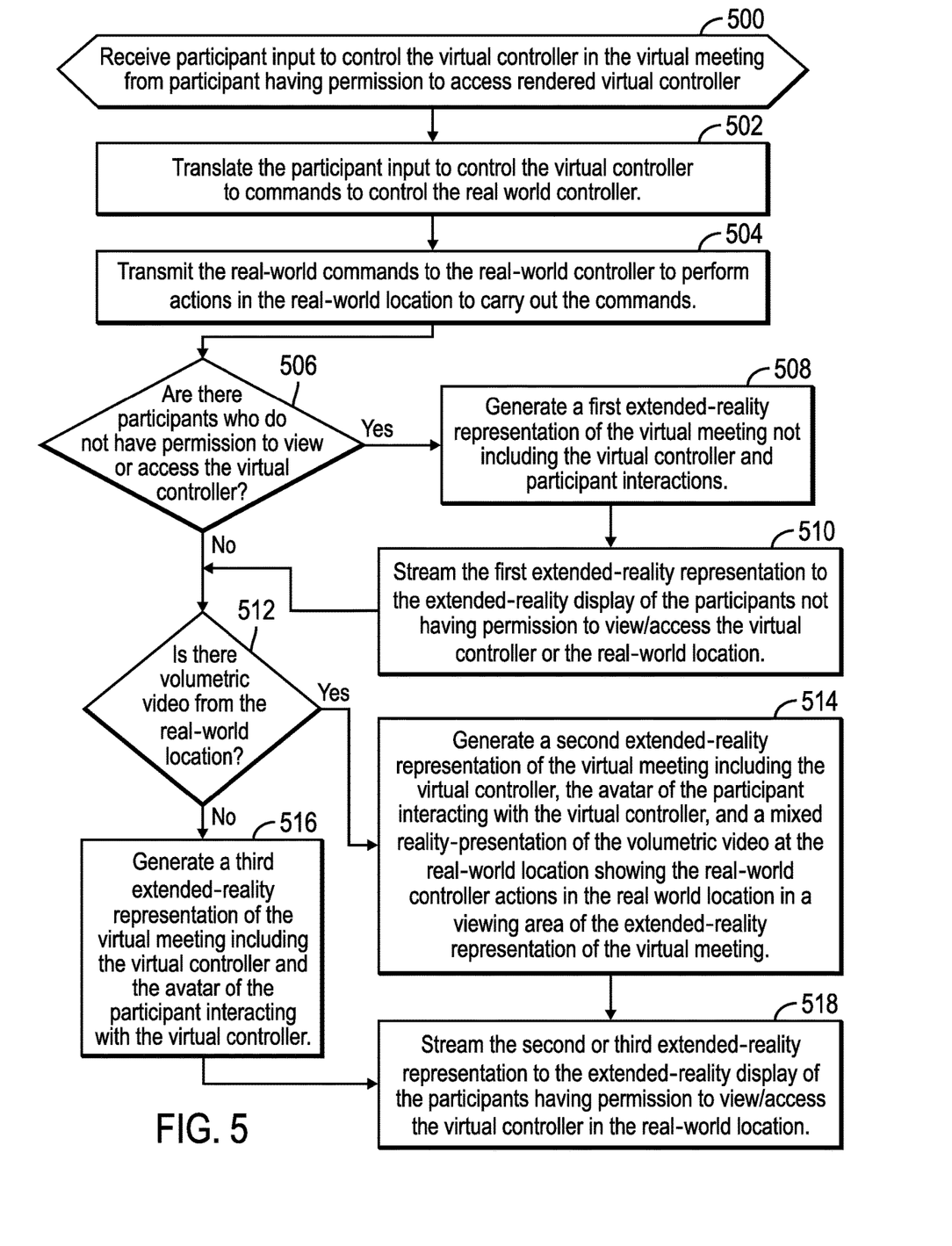
FIG. 5 illustrates an embodiment of operations to allow participants in a virtual meeting to control a virtual controller in a virtual meeting to control a real-world controller in a real-world location.

FIG. 5 illustrates an embodiment of operations performed by the virtual meeting manager 110 to control a real-world robot 108 through participant input. Upon receiving (at block 500), from the virtual meeting client 140, participant input, detected by the participant input detector 144 or extended-reality glasses 138, the virtual meeting manager 110 translates (at block 502) the participant input, to control the virtual controller $132_i$, to commands to control the real world controller. In certain embodiments, the virtual meeting manager 110 may use the command generator 208, identified in the virtual controller information $200_i$ for the virtual controller $132_i$, to receive inputs, comprising the real-time participant-input 112 to control the virtual controller $132_i$, participant input-to-command mapping 206 for the virtual controller $132_i$, sensed parameters 118 from the real-world location 106, and real-time real-world controller input 122, to generate the commands to control the real-world controller 108 given the specific conditions 118, 122. The virtual meeting manager 110 transmits (at block 504) the real-world commands to the real-world controller 108 to perform actions in the real-world location 106 to carry out the commands, such as move within the location 106, manipulate objects or machines, gather information, control systems.

If (at block 506) there are participants $128_j$ who do not have permission to view or access the virtual controller $132_i$, then the virtual meeting manager 110 generates (at block 508) a first extended-reality representation $126_1$ of the virtual meeting not including the virtual controller $132_i$ and participant interactions and streams (at block 510) the first extended-reality representation of the virtual meeting $126_1$ to the extended-reality display of the participants $128_j$ not having permission to view/access the virtual controller $132_i$ for the real-world location 106. In addition to generating the first extended-reality representation $126_1$ (from block 510) or if all participants $128_1$, $128_2$ . . . $128_n$ have permission to access the virtual controller $132_i$ (from the no branch of block 512), then if (at block 512) there is volumetric video 114 from the real world location 106, the virtual meeting manager 110 generates (at block 514) a second extended-reality representation $126_2$ of the virtual meeting including the virtual controller $132_i$, the avatar of the participant interacting with the virtual controller $132_i$, and a viewing area 127, of the extended-reality virtual meeting $126_2$, comprising a mixed reality-presentation of the real-world location 106, generated from the volumetric video 114. Participants not having permission to access the virtual controller $132_i$ may observe in their mixed reality representation $126_1$ either the avatar of the person manipulating the controller making gestures in empty space of the virtual meeting or observe a representation of the avatar in a default position not making any gestures to manipulate the virtual controller $132_i$.

If (at block 516) there is no volumetric video 114 for the real-world location 106, then the virtual meeting manager 110 may generate (at block 516) a third extended-reality representation of the virtual meeting $126_3$ including the virtual controller $132_i$ and the avatar of the participant interacting with the virtual controller $132_i$. The generated second $126_2$ or third $126_3$ virtual meeting is streamed (at block 518) to the extended-reality displays 138 of the participants having permission to access the virtual controller $132_i$ in the real world location 106.

In streaming to different participants, the virtual meeting manager 110 may generate entirely different virtual meeting environments $126_1$, $126_2$, $126_3$ with and without the virtual controller for participants having permission and not having permission, respectively to stream separately. In alternative embodiments, the virtual meeting manager 110 may send the same base virtual meeting environment 126 without any virtual controllers $132_i$ to all the participants and then send an extended-reality representation of the virtual controller, with volumetric video 114 of the real-world location 106, if available, only to the participants having permission to access the virtual controller $132_i$.

With the embodiment of FIG. 5, different virtual meeting presentations are provided to participants depending on their permission level to access the virtual controller $132_i$ being presented in the virtual meeting. Further, described embodiments, provide techniques to add volumetric video 114 of the real world location 106 into the viewing area 127 in the virtual meeting 126 to be streamed to the participants having permission to access the virtual controller $132_i$ for the particular real-world location 106.

In further embodiments, multiple instances of a virtual controller $132_i$ may be generated and located in reach of the avatars having permission to access the virtual controller $132_i$ to allow avatars to manipulate virtual controller $132_i$ adjacent to their position in the virtual meeting 126 and to allow for multiple participants to manipulate and control different instances of the same virtual controller $132_i$ avatar without interfering with the view and actions of other avatars, which would be the case if multiple avatars were crowding around a single instance of a virtual controller $132_i$ to manipulate.

The virtual meeting manager 110 would then stream virtual meetings 126 to participants that include all the instances of virtual controllers $132_i$ they are permitted to access, with volumetric video 114 if available.

In further embodiments, participants may collaborate in the control of a virtual controller $132_i$ in the virtual meeting to coordinate the corresponding operations of the real-world controller 108 at the real world location.

The virtual controllers $132_i$ may receive input from the extended-reality virtual meeting 126 environment to determine appropriate actions to control the real-world controller 108 based on interpretation of participant actions in the virtual meeting 126. The virtual controller $132_i$ may interact with the meeting participants $128_1$, $128_2$ . . . $128_n$ by providing information on the real-world controller 108 operations, status, and operating conditions in the real-world location 106.

Participants $128_1$, $128_2$ . . . $128_n$ may monitor the activities of other participants with respect to the virtual controller $132_i$ to coordination control and implement an appropriate working sequence for the real-world controller 108.

Participants $128_1$, $128_2$ . . . $128_n$ in the virtual meeting 126 may identify movements and actions of the real-world virtual controller 108 by observing movements of the virtual controller $132_n$ in the mixed reality representation of the real-world location in viewing region 127. Additionally, participants $128_1$, $128_2$ . . . $128_n$ can observe movements of the real-world virtual controller 108 by observing movements of the virtual controller $132_n$ in the virtual meeting 126, even if no viewing region 127 of an extended-reality presentation of the real-world location 106 is rendered.

The participant $128_1$, $128_2$ . . . $128_n$ actions with respect to a virtual controller $132_i$ may be stored as historical data to support historical learning for assigning activities to virtual controllers $132_i$ in future virtual meetings 126.

The virtual meeting manager 110 may validate requests to add virtual controllers $132_i$ to provide virtual assistance by having a policy to define the types of virtual controllers and virtual assistance permitted for a group of participants $128_1$, $128_2$ . . . $128_n$.

When a virtual assistant 134 or virtual controller $132_i$ is added to the virtual meeting 126, then the participant avatars may be rendered with a different look and feel from bots such as the virtual assistance 134 and virtual controller 132 to provide distinction.

The participant input 112 to the virtual meeting 126 can be in the form of audio and detecting movements of avatars in the virtual meeting 126. The virtual controller $132_i$ will provide appropriate replies to the participants having access to the virtual controller $132_i$.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
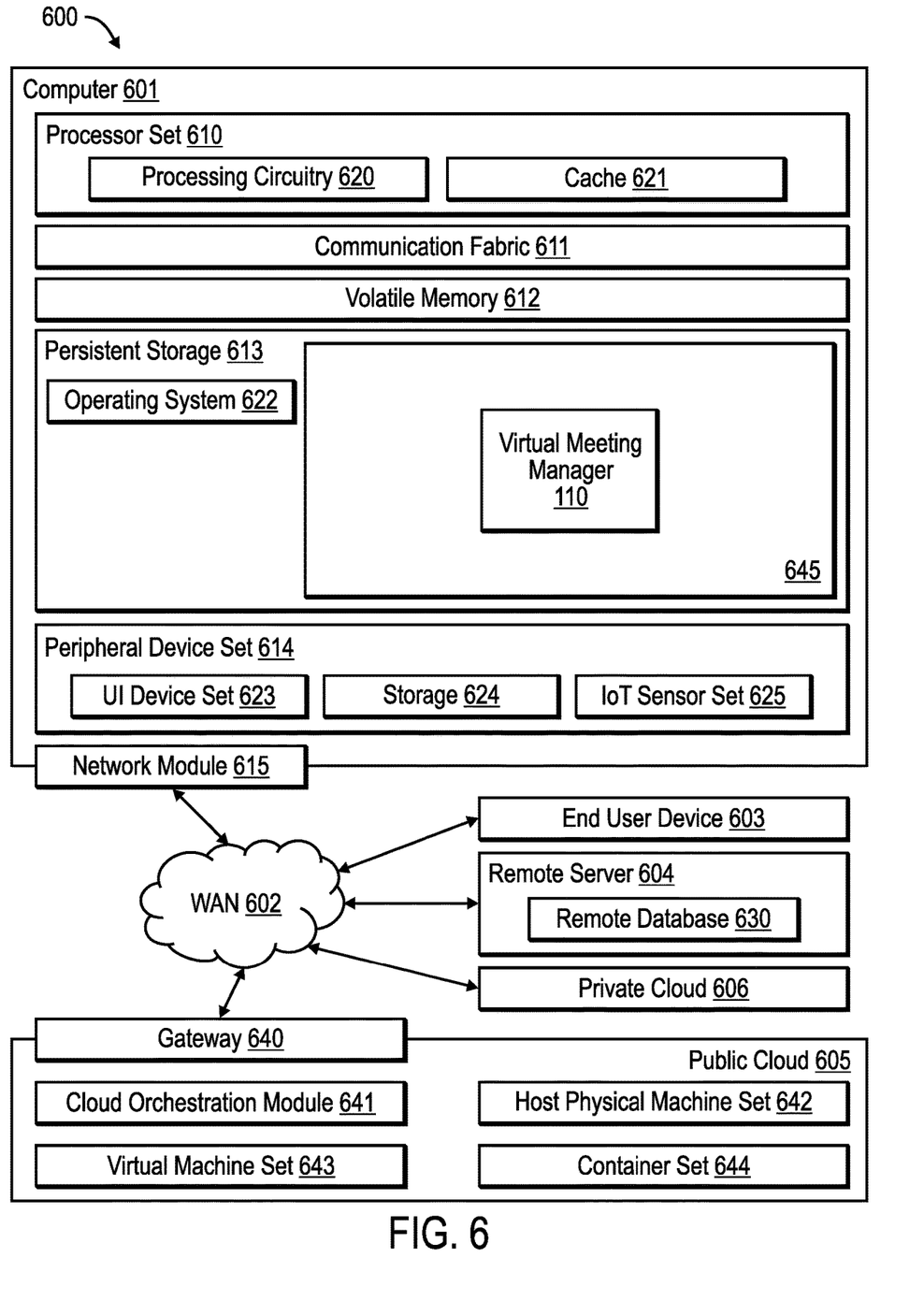
FIG. 6 illustrates a computing environment in which the components of FIG. 1 may be implemented.

Computing environment 600 contains an example of an environment for the execution of at least some of the computer code 601 involved in performing the inventive methods, such as generating a virtual meeting mixed reality environment 126 including virtual controllers $132_1$, $132_2$ ... $132_n$ representing real-world controllers in a real world location 106 the participants in the virtual meeting, represented by avatars, may access to control the real-world controllers from the virtual meeting.

In addition to block 601, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 601, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel.

The code included in block 645 typically includes at least some of the computer code involved in performing the inventive methods, including the virtual meeting manager 110.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on. In described embodiments, the EUD 603 may comprise the participant computing devices 104 of FIG. 1.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604. In described embodiments, the EUD 603 may comprise the real-world system 146 of FIG. 1.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The letter designator i is used herein to designate a specific element of a group of elements of a same type and may identify any suitable element of the group of elements of a type when used with the same or different type of elements. The letter designator n is used to designate a specific element or a number of instances of an element, and may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for interacting in a virtual meeting extended-reality environment, the computer program product comprising a computer readable storage medium having computer readable program code embodied therein that is executable to perform operations, the operations comprising:

generating an extended-reality representation of a virtual meeting including avatars associated with participants in the virtual meeting to render in extended-reality displays of the participants in the virtual meeting;

generating in the virtual meeting an extended-reality representation of a virtual controller corresponding to a real-world controller in a real-world location to render in at least one extended-reality display of at least one participant in the virtual meeting;

receiving participant input from one of the at least one participant to control the virtual controller;

translating the participant input to control the virtual controller to commands to control the real-world controller; and transmitting the commands to the real-world controller at the real-world location to control the real-world controller to perform actions in the real-world location to carry out the transmitted commands.

2. The computer program product of claim 1, wherein the virtual controller comprises a virtual robot, and wherein the real world controller comprises a real-world robot capable of moving in the real-world location to interact with objects in the real-world location according to the transmitted commands.

3. The computer program product of claim 1, wherein the virtual controller comprises a virtual cloud-based service and the real-world controller comprises a real-world cloud-based service device, wherein the transmitted commands cause the real-world cloud-based service device to control components in the real-world location.

4. The computer program product of claim 1, wherein the operations further comprise:

determining the at least one participant in the meeting that has permission to access the virtual controller, wherein the extended-reality representation of the virtual meeting is rendered in the at least one extended-reality display of the at least one participant having permission to view the virtual controller; and generating an additional extended-reality representation of the virtual meeting including the avatars associated the participants in the virtual meeting without rendering the virtual controller to render in the at least one extended-reality display of at least one participant in the virtual meeting that does not have permission to view the virtual controller.

5. The computer program product of claim 1, wherein the operations further comprise:

determining a plurality of participants in the meeting having permission to access the virtual controller, wherein the virtual meeting is rendered in the extended-reality displays of the participants having permission to view the virtual controller;

receiving commands from the participants in the meeting that have permission to access the virtual controller to control the virtual controller; and transmitting the commands from the participants determined to have access to the real-world controller at the real-world location to control the real-world controller to perform actions in the real-world location to carry out the commands.

6. The computer program product of claim 1, wherein the operations further comprise:

receiving streaming video of the real-world location produced from volumetric video cameras located in the real-world location and capturing video of the real-world location in which the real-world controller is operating; and rendering, in the at least one extended-reality display of the at least one participant, a viewing region, of the extended-reality representation of the virtual meeting, including an extended-reality representation of the real-world location generated from the received streaming video of the real-world location to enable the at least one participant to view the real-world location being acted upon by the real-world controller within the virtual meeting.

7. The computer program product of claim 1, wherein the operations further comprise:
rendering virtual controls on the virtual controller displayed in the at least one extended-reality display of the at least one participant; and
detecting manipulations of the virtual controls by the at least one participant in the virtual meeting, wherein the received participant input comprises the detected manipulations.

8. The computer program product of claim 1, wherein the operations further comprise:
rendering the virtual meeting to include at least one additional virtual controller, corresponding to at least one additional real-world controller in the real-world location or at least one additional real-world location, in the at least one extended-reality display of the at least one participant.

9. The computer program product of claim 1, wherein the operations further comprise:
determining participants in the virtual meeting allowed to control the virtual controller; and
rendering a plurality of instances of the virtual controller in the virtual meeting to assign to the determined participants allowed to control the virtual controller, wherein the participants manipulate the instances of the virtual controller most proximate to the avatars of the participants in the virtual meeting.

10. A system for interacting in a virtual meeting extended-reality environment, comprising:
a processor; and
a computer readable storage medium having computer readable program code embodied therein that when executed by the processor performs operations, the operations comprising:
generating an extended-reality representation of a virtual meeting including avatars associated with participants in the virtual meeting to render in extended-reality displays of the participants in the virtual meeting;
generating in the virtual meeting an extended-reality representation of a virtual controller corresponding to a real-world controller in a real-world location to render in at least one extended-reality display of at least one participant in the virtual meeting;
receiving participant input from one of the at least one participant to control the virtual controller;
translating the participant input to control the virtual controller to commands to control the real-world controller; and
transmitting the commands to the real-world controller at the real-world location to control the real-world controller to perform actions in the real-world location to carry out the transmitted commands.

11. The system of claim 10, wherein the virtual controller comprises a virtual robot, and wherein the real world controller comprises a real-world robot capable of moving in the real-world location to interact with objects in the real-world location according to the transmitted commands.

12. The system of claim 10, wherein the operations further comprise:
determining the at least one participant in the meeting that has permission to access the virtual controller, wherein the extended-reality representation of the virtual meeting is rendered in the at least one extended-reality display of the at least one participant having permission to view the virtual controller; and
generating an additional extended-reality representation of the virtual meeting including the avatars associated the participants in the virtual meeting without rendering the virtual controller to render in the at least one extended-reality display of at least one participant in the virtual meeting that does not have permission to view the virtual controller.

13. The system of claim 10, wherein the operations further comprise:
determining a plurality of participants in the meeting having permission to access the virtual controller, wherein the virtual meeting is rendered in the extended-reality displays of the participants having permission to view the virtual controller;
receiving commands from the participants in the meeting that have permission to access the virtual controller to control the virtual controller; and
transmitting the commands from the participants determined to have access to the real-world controller at the real-world location to control the real-world controller to perform actions in the real-world location to carry out the commands.

14. The system of claim 10, wherein the operations further comprise:
receiving streaming video of the real-world location produced from volumetric video cameras located in the real-world location and capturing video of the real-world location in which the real-world controller is operating; and
rendering, in the at least one extended-reality display of the at least one participant, a viewing region, of the extended-reality representation of the virtual meeting, including an extended-reality representation of the real-world location generated from the received streaming video of the real-world location to enable the at least one participant to view the real-world location being acted upon by the real-world controller within the virtual meeting.

15. The system of claim 10, wherein the operations further comprise:
determining participants in the virtual meeting allowed to control the virtual controller; and
rendering a plurality of instances of the virtual controller in the virtual meeting to assign to the determined participants allowed to control the virtual controller, wherein the participants manipulate the instances of the virtual controller most proximate to the avatars of the participants in the virtual meeting.

16. A method for interacting in a virtual meeting extended-reality environment, comprising:
generating an extended-reality representation of a virtual meeting including avatars associated with participants in the virtual meeting to render in extended-reality displays of the participants in the virtual meeting;
generating in the virtual meeting an extended-reality representation of a virtual controller corresponding to a real-world controller in a real-world location to render in at least one extended-reality display of at least one participant in the virtual meeting;
receiving participant input from one of the at least one participant to control the virtual controller;

translating the participant input to control the virtual controller to commands to control the real-world controller; and transmitting the commands to the real-world controller at the real-world location to control the real-world controller to perform actions in the real-world location to carry out the transmitted commands.

17. The method of claim 16, wherein the virtual controller comprises a virtual robot, and wherein the real world controller comprises a real-world robot capable of moving in the real-world location to interact with objects in the real-world location according to the transmitted commands.

18. The method of claim 16, further comprising:

determining the at least one participant in the meeting that has permission to access the virtual controller, wherein the extended-reality representation of the virtual meeting is rendered in the at least one extended-reality display of the at least one participant having permission to view the virtual controller; and generating an additional extended-reality representation of the virtual meeting including the avatars associated the participants in the virtual meeting without rendering the virtual controller to render in the at least one extended-reality display of at least one participant in the virtual meeting that does not have permission to view the virtual controller.

19. The method of claim 16, further comprising:

determining a plurality of participants in the meeting having permission to access the virtual controller, wherein the virtual meeting is rendered in the extended-reality displays of the participants having permission to view the virtual controller;

receiving commands from the participants in the meeting that have permission to access the virtual controller to control the virtual controller; and transmitting the commands from the participants determined to have access to the real-world controller at the real-world location to control the real-world controller to perform actions in the real-world location to carry out the commands.

20. The method of claim 16, further comprising:

receiving streaming video of the real-world location produced from volumetric video cameras located in the real-world location and capturing video of the real-world location in which the real-world controller is operating; and rendering, in the at least one extended-reality display of the at least one participant, a viewing region, of the extended-reality representation of the virtual meeting, including an extended-reality representation of the real-world location generated from the received streaming video of the real-world location to enable the at least one participant to view the real-world location being acted upon by the real-world controller within the virtual meeting.

* * * * *